(12) United States Patent
Hsu

(10) Patent No.: US 7,576,544 B1
(45) Date of Patent: Aug. 18, 2009

(54) ELECTRIC QUANTITY INDICATOR FOR AN ELECTROMOTIVE VEHICLE

(75) Inventor: Tsun-Tying Hsu, Taoyun (TW)

(73) Assignee: Index Electronic Co., Ltd., Taoyuan (TW)

( * ) Notice: Subject to any disclaimer, the term of this patent is extended or adjusted under 35 U.S.C. 154(b) by 0 days.

(21) Appl. No.: 09/460,974

(22) Filed: Dec. 15, 1999

(30) Foreign Application Priority Data

Dec. 16, 1998 (TW) .............................. 87220914 U

(51) Int. Cl.
*G01N 27/416* (2006.01)
*G01R 15/00* (2006.01)
*G01R 11/32* (2006.01)
*H02J 7/00* (2006.01)

(52) U.S. Cl. ................ 324/426; 324/427; 324/132; 324/134; 324/434; 320/132

(58) Field of Classification Search ............ 324/426, 324/427, 134, 132, 434; 320/132, DIG. 21, 320/DIG. 24
See application file for complete search history.

(56) References Cited

U.S. PATENT DOCUMENTS 5,789,901 A * 8/1998 Lomholt .................. 324/134
6,064,182 A * 5/2000 Eguchi .................... 324/132
6,094,053 A * 7/2000 Harvey .................... 324/434

* cited by examiner

*Primary Examiner*—Safet Metjahic
*Assistant Examiner*—Wasseem H. Hamdan
(74) *Attorney, Agent, or Firm*—Lowe Hauptman Ham & Berner, LLP

(57) ABSTRACT

An electric quantity indicator for an electromotive vehicle comprises an electric measuring wire parallel connected to a battery; a feedback circuit connected between a motor of the power supply load and the electric measuring wire; and a meter responsed to the quantity of electricity of the electric measuring wire. The meter is an electronic display panel, and the feedback circuit and the electric measuring wire are installed with analog to digital (A/D) converter for address dividing the value in a memory, in which this value is displayed in the aforesaid meter. Thereby, as a load is actuated and power is consumed, the feedback circuit will detect, and the electric measuring wire will conduct, a real value about the power stored in the battery is displayed on the meter so as to be viewed by a user. Therefore, the condition that due to an error of electric quantity, the user can not know the real the electric quantity and thus the car is stopped owing to exhaustion of electric power is avoided.

1 Claim, 3 Drawing Sheets

ELECTRIC QUANTITY INDICATOR FOR AN ELECTROMOTIVE VEHICLE

FIELD OF THE INVENTION

The present invention relates to an improvement of the electric quantity indicator for an electromotive vehicle, and especially to an electric quantity indicator without measuring a virtual voltage as the battery is stopped.

BACKGROUND OF THE INVENTION

Since the resource of earth is finite, and combustion will induce air pollution in the environment; the conventional way of deriving power from oil is replaced by electric power which is suitable for the requirement of environmental protection. For example, the electromotive vehicle is an apparent example. However, the power supplies are not popular in many places. A large charging time is required and the amount of power can not be seen. Therefore, a current detector is required for the driver because no one hopes to push an electromotive vehicle along a roadway due to exhaustion of power without a fault indication.

FIG. 4 shows a prior art electric quantity indicator, wherein in the initial position, a voltmeter is installed. The measuring result is indicated by a scale for viewing the storage electric quantity so as to estimate traveling length of the electromotive vehicle. As the user is at home, he may charge the battery in order to avoid a loss of power on a highway. However, such a design has some defects so that the real electric quantity can not be indicated. Since as a battery is stopped and rests for a period of time, the voltage will increase so as to present a virtual voltage as shown in FIG. 5. Thus, in the prior art, it is possible that the indicator shows that 90 percent of power is stored, but practically, only 30 percent of the power is stored. Therefore, a user will make a mistake due to an incorrect indication.

SUMMARY OF THE INVENTION

Accordingly, the primary object of the present invention is to provide an electric quantity indicator for an electromotive vehicle, which can show the real electric quantity.

In order to achieve the aforesaid object, the present invention provides an electric quantity indicator for an electromotive vehicle comprising: an electric measuring wire parallel connected to a battery; a feedback circuit connected between a motor of the power supply load and the electric measuring wire; and a meter responds to the quantity of electricity of the electric measuring wire; and a meter responds to the quantity of electricity of the electric measuring wire. The meter is an electronic display panel, and the feedback circuit and the electric measuring wire are installed with analog to digital (A/D) converters for address dividing to the value in a memory, in which this value is displayed in the aforesaid meter. Thereby, as a load is actuated and power is consumed, the feedback circuit will detect and the electric measuring wire will conduct, real power storage is displayed on the meter so as to be viewed by a user.

The various objects and advantages of the present invention will be more readily understood from the following detailed description when read in conjunction with the appended drawing.

DETAILED DESCRIPTION OF THE PREFERRED EMBODIMENTS

Figure 1:
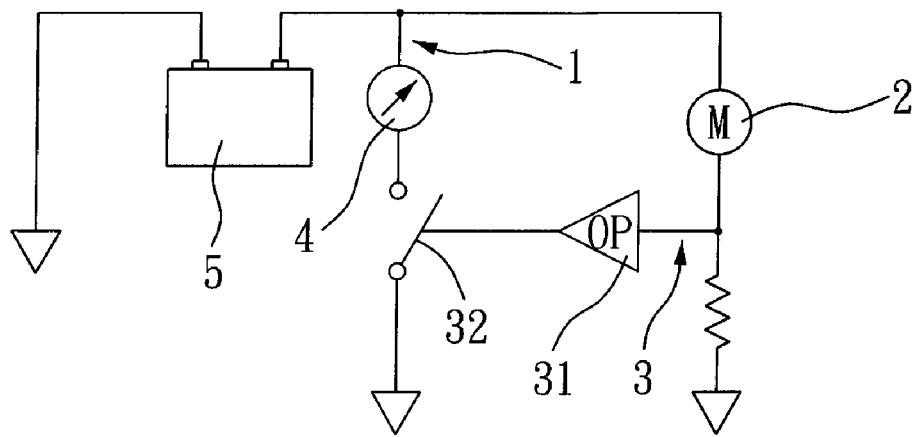
FIG. 1 shows a circuit diagram of the first embodiment about the quantity of electricity indicator according to the present invention.

Referring to FIG. 1, the quantity of electricity indicator of an electromotive vehicle according to the present invention is illustrated, which comprises:

An electric measuring wire 1 is parallel connected to a battery 5.

A feedback circuit 3 is connected between the motor of the power supply load 2 and the electric measuring wire 1.

A meter 4 responds to the quantity of electricity of the electric measuring wire 1.

In the first embodiment, the meter 4 is a simple non-reset meter which is connected in series to the electric measuring wire 1. An amplifier 31 is installed at the feedback circuit 3 for amplifying signals. The output of the amplifier 31 can actuate a control switch 32 to control the electric measuring time for the conduction of the electric measuring wire 1.

Figure 5:
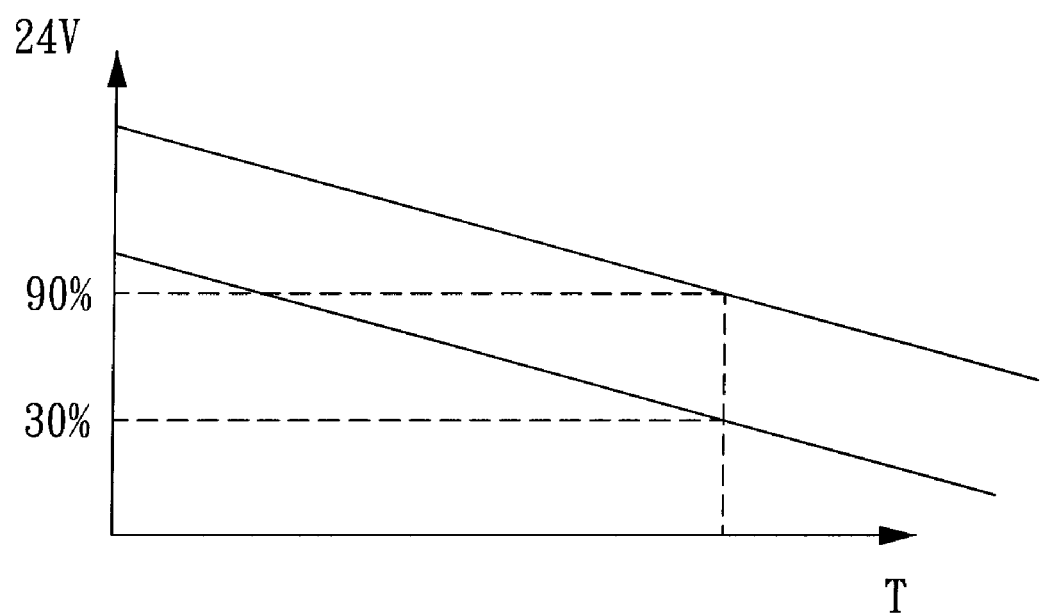
FIG. 5 shows a coordinate of the equal quantity of a battery.

Thereby, with reference to FIGS. 1 and 5, in the design of the present invention, as the motor of the load 2 is actuated and a large current is generated, the feedback circuit 3 conducts a signal 6 to the control switch 32. Then, the electric quantity is displayed on the quantity of electricity indicator for being viewed by the user. A non-reset electric meter is used and feedback detection is only used in response to a large current. After detecting, the displayed electric quantity will not restore without any response to the virtual current generated from the battery 5 which is switched off. Other than a large current generates so that the current electric quantity is reduced, the data on the meter 4 may response the real electric quantity stored in the battery 5 for being viewed by the user. Therefore, in the prior art application, due to an error of electric quantity, the user can not know the real electric quantity and thus the car may stop due to exhaustion of electric power.

Figure 2:
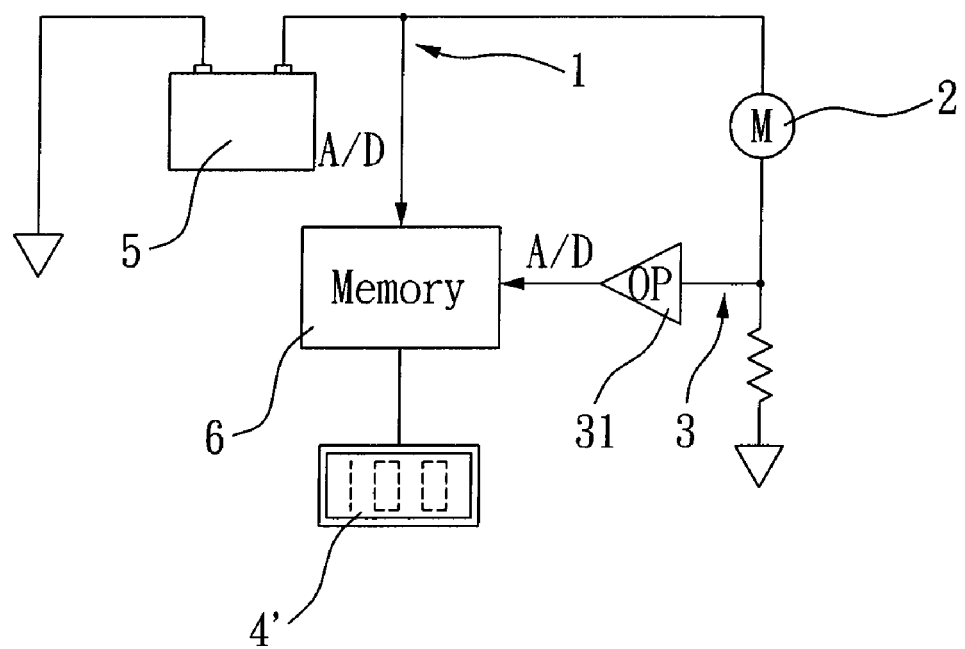
FIG. 2 shows a circuit diagram of the second embodiment about the quantity of electricity indicator according to the present invention.
Figure 3:
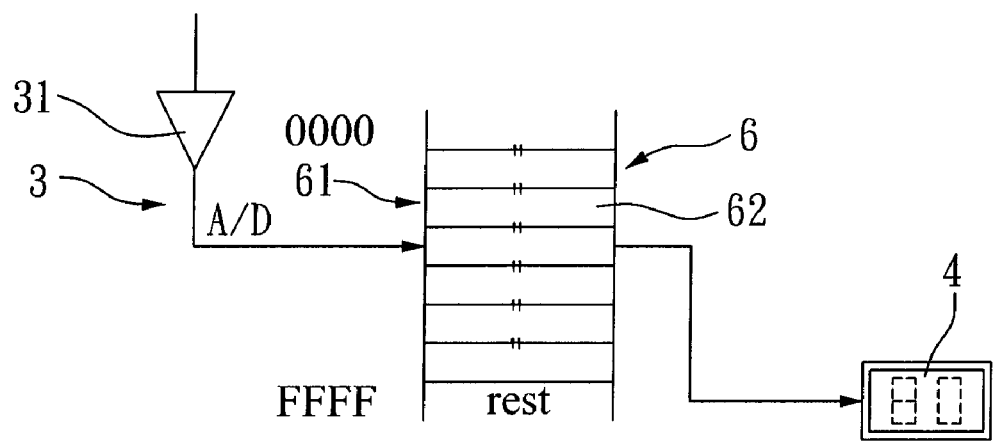
FIG. 3 is a schematic view showing the display of the converted value in the second embodiment of the present invention.
Figure 4:
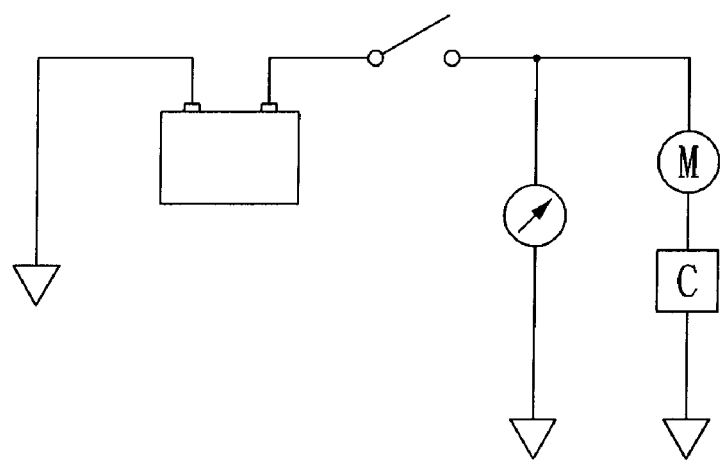
FIG. 4 is a circuit diagram of a prior art of a quantity of electricity indicator.

With reference to FIGS. 2 and 3, the second embodiment of the present invention is illustrated. The meter 4' can be an electronic display panel. The feedback circuit 3 and the electric measuring wire 1 are installed with an A/D converter for corresponding to a recording value 62 divided by an address 61 in memory 6 so that the value is displayed on the meter.

In order that the meter 4 responds to the storage of battery 5, in control, the feedback circuit 3 is used to measure a large current. Moreover, the recorded value 62 in the memory 6 is only reduced as the battery 5 changes from a high voltage to exhaustion of all power. If the battery is stopped so that voltage increases, it will not be recorded except that the battery 5 is charged and voltage is increased to a certain value (for example, a maximum value of charge saturation), then the memory 6 will reset to record the high value again. Therefore, an error due to virtual voltage is avoided.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An electric quantity indicator for a battery in an electromotive vehicle comprising:

a battery, an electric wire and a non-reset measuring meter connected to said battery by said wire;

a motor, a control switch and a feedback circuit connecting said meter and said motor in parallel through said switch and an amplifier having an output end disposed in said feedback circuit the output of the amplifier serving to actuate said control switch for controlling the conduction of the electric measuring wire through said meter to measure electric quantity and wherein said feedback circuit is actuated by the power consumption of said motor to close said switch to connect said feedback circuit to said meter so that the real power storage is displayed on said meter; and wherein the non-reset measuring meter is responsive only to a reduction in measured voltage and not to any increase in measured voltage.

\* \* \* \* \*